United States Patent [19]

Krizmanic

[11] Patent Number: 4,578,740
[45] Date of Patent: Mar. 25, 1986

[54] HEADLAMP WITH ADJUSTABLE REFLECTOR FOR MOTOR VEHICLES

[75] Inventor: Jacky Krizmanic, Sens, France

[73] Assignee: Societe de Signalisations Automobiles S.E.I.M.A., Sens, France

[21] Appl. No.: 596,467

[22] PCT Filed: Jul. 8, 1983

[86] PCT No.: PCT/EP83/00179
§ 371 Date: Mar. 9, 1984
§ 102(e) Date: Mar. 9, 1984

[87] PCT Pub. No.: WO84/00332
PCT Pub. Date: Feb. 2, 1984

[30] Foreign Application Priority Data

Jul. 16, 1982 [FR] France ................. 82 12512

[51] Int. Cl.$^4$ ............................................. B60Q 1/06
[52] U.S. Cl. .......................................... 362/66; 362/80;
362/287; 362/226; 362/289; 362/273; 362/310;
362/372; 362/347; 362/350; 362/428
[58] Field of Search ............. 362/226, 267, 347–350,
362/66, 80, 271, 273, 287, 310, 372, 428

[56] References Cited

U.S. PATENT DOCUMENTS

| 3,949,215 | 4/1976 | Whitney | 362/226 |
| 4,293,897 | 10/1981 | Deverrewaere | 362/226 |
| 4,306,276 | 12/1981 | Dick | 362/226 |
| 4,318,162 | 3/1982 | Sip | 362/226 |

FOREIGN PATENT DOCUMENTS

| 3028700 | 2/1982 | Fed. Rep. of Germany . | |
| 2421757 | 7/1979 | France | 362/267 |

Primary Examiner—Peter A. Nelson
Attorney, Agent, or Firm—Karl F. Ross; Herbert Dubno

[57] ABSTRACT

The invention relates to a headlamp with adjustable reflector for motor vehicles, comprising a housing mounted on the body of the vehicle and a cover disc which is attached to the housing by means of a groove-rib connection, also a reflector arranged in the housing, which is horizontally and vertically adjustable. The reflector carries on its circumference a joint ball, which rotates in a bearing connected to the housing on the cover disc, and an axle which is located substantially in the same horizontal plane as the joint ball and is rotatable in a shoe which is attached in the housing with substantially horizontal sliding mobility. Bearing and shoe are accommodated in spaces which are located in alignment on the housing behind at least one groove-rib connection of the cover disc. The front closure of the spaces and the continuity of the shape of the connecting edge zone are achieved simultaneously by the packing of the bearing with an end profile of the groove and rib type and, by the bent edge of at least one cover, for a partial section of the groove-rib connection, which closes at least the accommodation space of the shoe. The rear surface of the reflector carries an actuating rod, which is located in said horizontal plane, and a second actuating rod which is arranged in another horizontal plane. The adjusting parts are arranged substantially horizontally to the actuating rods.

6 Claims, 5 Drawing Figures

HEADLAMP WITH ADJUSTABLE REFLECTOR FOR MOTOR VEHICLES

CROSS REFERENCE TO RELATED APPLICATIONS

This application is a national phase application corresponding to PCT/EP83/00179 filed Mar. 16, 1984 and based upon French application No. 82.12512 filed July 16, 1982 under the International Convention.

Field of the Invention

The invention relates to a headlamp with an adjustable reflector for motor vehicles, comprising a housing mounted on the body of the vehicle and a cover disc which is attached to the housing by means of a groove-rib connection. The housing carries a horizontally and vertically adjustable reflector.

BACKGROUND OF THE INVENTION

In known headlamps of this type the components for adjusting the pivoting the reflector occupy considerable space in the housing, particularly at the circumference of the reflector. This occupation of space reduces the effective illuminating aperture of the reflector in proportion to the available surface of the cover disc and prejudices the aesthetic appearance of the headlamp when it is not in service.

In order to eliminate this disadvantage, it has already been proposed to fit a molding on the housing around the edge of the reflector; however this complicates the construction of the headlamp without improving its efficiency.

OBJECT OF THE INVENTION

The principal aim of the invention is to overcome the disadvantages of known headlamps and to provide an improved headlamp, wherein The surface of the cover disc is utilised to the full and the adjusting devices occupy only a small space, and are furthermore virtually invisible from the exterior.

SUMMARY OF THE INVENTION

According to the invention, this object is achieved in a headlamp of the type previously defined when the reflector carries on its circumference a joint ball (ball joint), which rotates in a bearing connected to the housing on the cover disc, and an axle (shaft) which is located substantially in the same horizontal plane as the joint ball and is rotatable in a shoe which is secured in the housing with substantially horizontal sliding mobility, while bearing and shoe are accommodated in spaces which are located in alignment behind at least one groove-rib connection of the cover disc on the housing. The front closure of the spaces and the continuity of the shape of the connecting edge zone are achieved simultaneously by the packing of the bearing with an end profile of the groove and rib type and by the bent edge of at least one cover, for a partial section of the groove-rib connection, which closes at least the accommodation space of the shoe. The rear surface of the reflector carries an actuating rod, which is located in said horizontal plane, and a second actuating rod which is arranged in another horizontal plane. The adjusting parts are arranged substantially horizontally to the actuating rods.

The invention is described more fully with reference to the drawing, in which:

Specific Description

Figure 1:
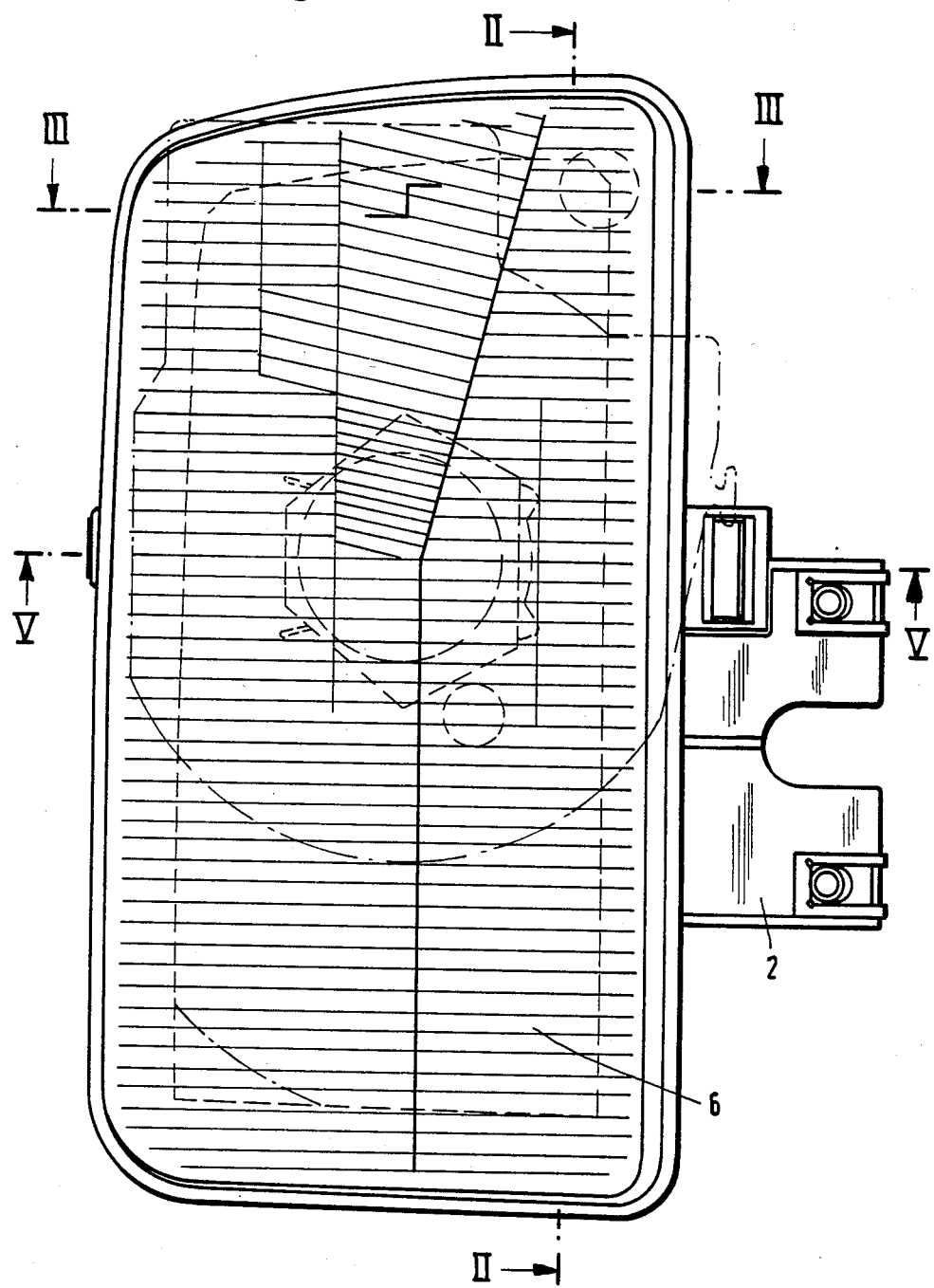
FIG. 1 is an elevation of a headlamp according to an exemplary embodiment of the invention.
Figure 2:
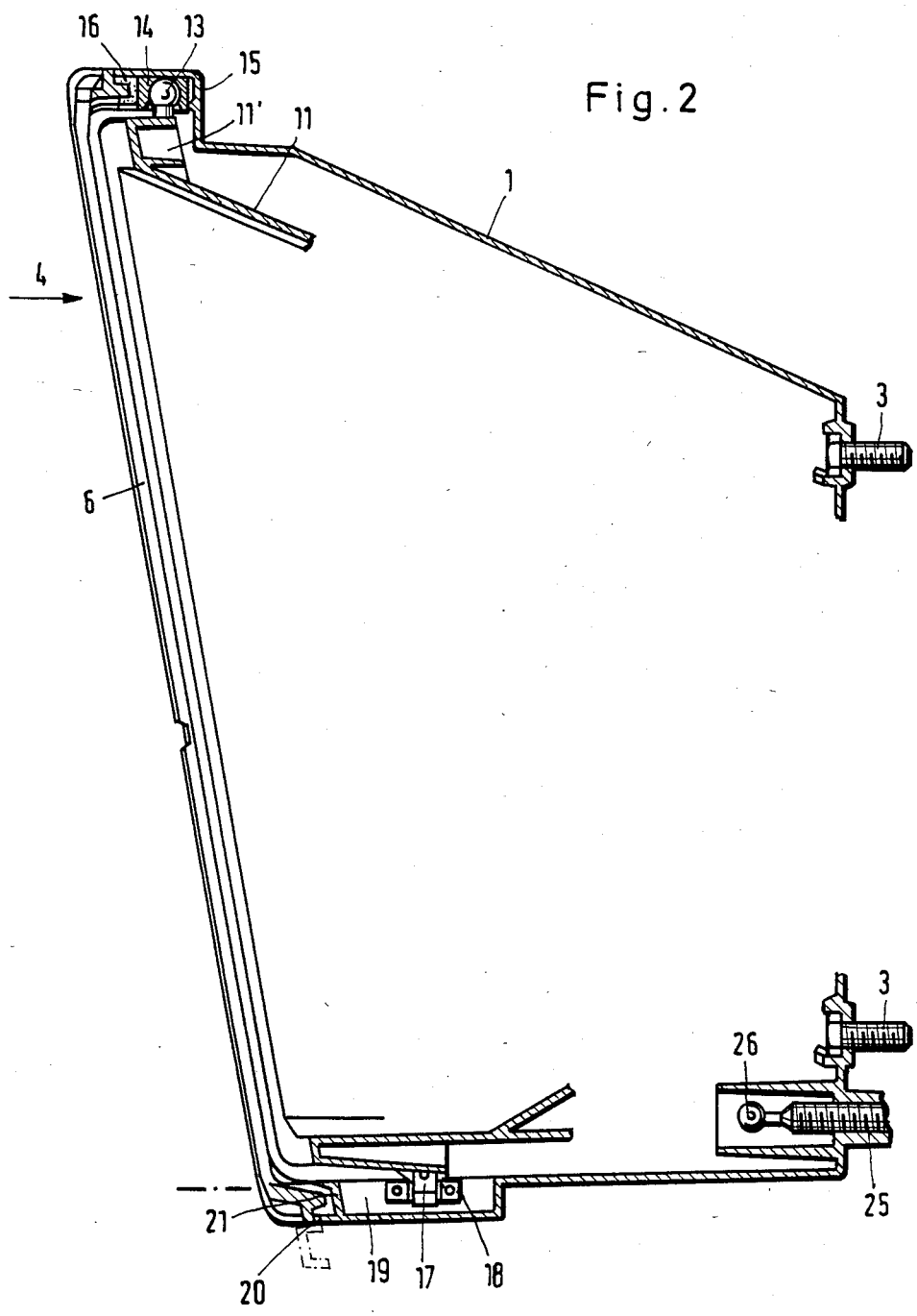
FIG. 2 is a sectional view along the line II—II in FIG. 1.
Figure 3:
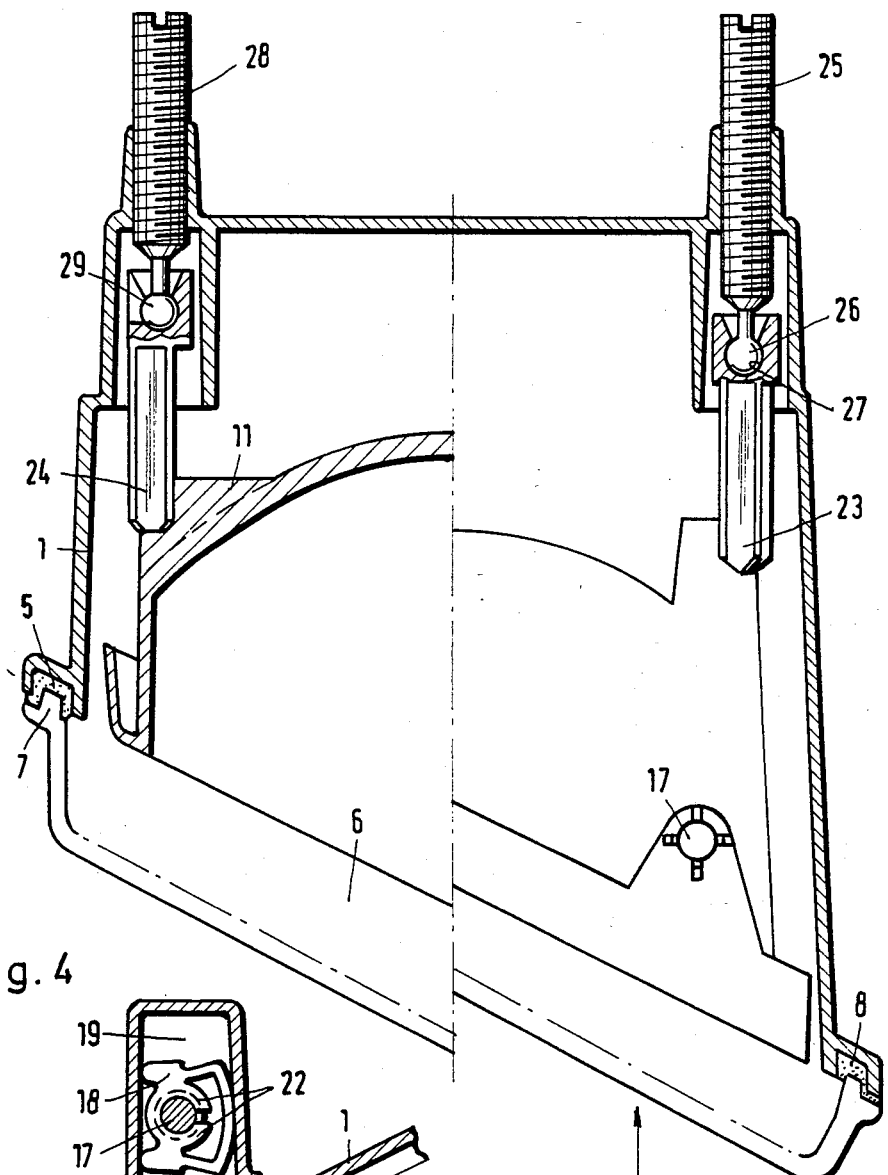
FIG. 3 is a sectional view along the line III—III in FIG. 1.
Figure 4:
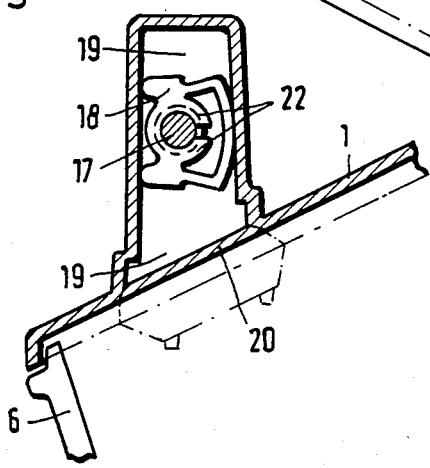
FIG. 4 is a sectional view along the line IV in FIG. 2 on a larger scale.
Figure 5:
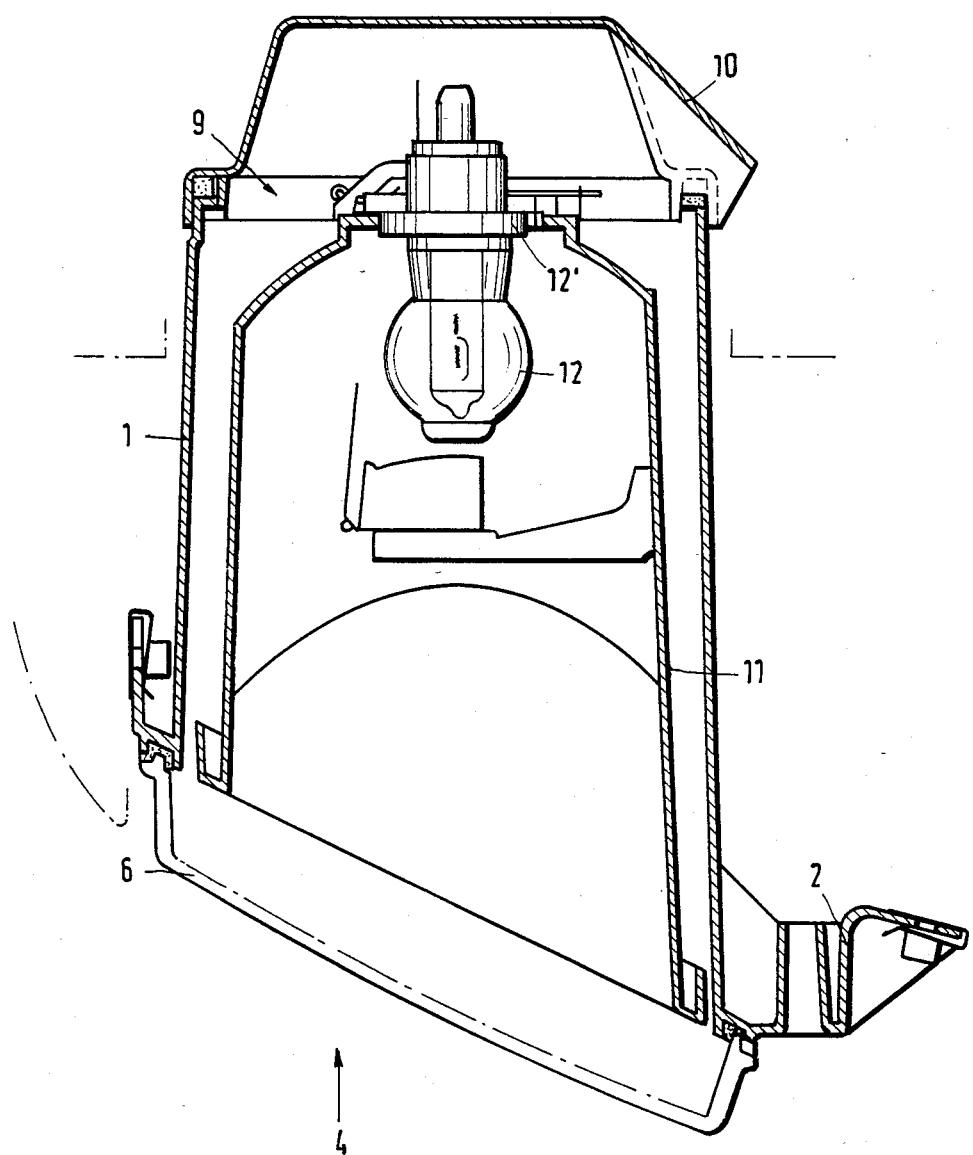
FIG. 5 is a sectional view along the line IV—IV in FIG. 1.

The headlamp according to the invention comprises a housing 1, which is connected to the body (not shown) by a front angle piece 2 and by rear screws 3. The housing 1 has a front aperture 4 which is framed by a groove 5. The aperture 4 is closed by a cover disc 6 on which a circumferential rib 7 is present which is secured in the groove 5 by means of an adhesive 8. The housing 1 also has a rear aperture 9, which is closed by a cover 10. A reflector 11, which carries an incandescent lamp 12 in a lamp holder 12', is arranged in the housing 1 so that it can be adjusted horizontally and vertically. Devices for this purpose are known and therefore need not be described in detail here.

According to the invention the reflector 11 exhibits at its circumference a substantially horizontal lug 11', which is oriented outwards and terminates in a joint ball 13. The joint ball 13 rotates in a bearing 14, which in the exemplary embodiment illustrated is accommodated in a lateral bulge 15 of the housing 1, which issues into the bottom of the groove 5 of the housing. For this purpose the bearing 14 is provided with a groove 16 which ensures the continuity of the groove 5.

Substantially in the same horizontal plane as the lug 11', the reflector 11 carries, opposite the lug 11', an axle stub or shaft 17 which is rotatable in a shoe 18. The shoe 18 slides in a groove 19, which is molded into the housing 1 substantially horizontally and is closed by a cover 20 which exhibits a groove 21 which prolongs the groove 5. The shoe 18 encloses the axle 17 with arms 22 which permit a certain angular movement of the axle 17 but embrace the latter.

The reflector 11 carries two adjusting rods 23 and 24 on its rear side. The rod 23 is arranged substantially in the same horizontal plane which passes through the lug 11' and the axle stub 17, and can be adjusted in the longitudinal direction by an adjusting screw 25, which cooperates with a screw thread moulded into the housing 1. The screw 25 terminates in a joint head 26, which cooperates with a recess 27 in the rod 23. The screw 25 exerts a tractive or compressive influence upon the shoe 18 whereby the reflector 11 is pivoted at the joint ball 13 about a substantially vertical axis, so that a manual correction of the headlamp adjustment according to the horizontal attitude of the vehicle can be performed. The joint ball absorbs axial displacements between rod 23 and screw 25.

The rod 24, which is arranged in a horizontal plane remote from the plane of the rod 23, is likewise actuated by a screw 28 provided with a joint ball 29. The adjustment of the screw 28 effects a pivoting of the reflector 11 about a substantially horizontal axis, which passes through the axle 17 and the center of the joint ball 13;

by this means the adjustment of the reflector in the vertical direction can be corrected.

Obviously, the adjustment of the rods 23 and/or 24 may be effected by mechanical, hydraulic or electrical remote control means or by an automatic control apparatus.

I claim:

1. In a headlamp with an adjustable reflector for a motor vehicle, comprising a housing mounted on the body of the vehicle and a cover disc which is attached to the housing by means of a groove-rib connection, and a reflector arranged in the housing, which is horizontally and vertically adjustable, the improvement wherein the reflector carries on its circumference a joint ball which rotates in a bearing connected to the housing on the cover disc, and the reflector also has on its circumference an axle which is located substantially in the same horizontal plane as the joint ball and is rotatable in a shoe which is secured in the housing with substantially horizontal sliding mobility, said bearing and shoe being accommodated in spaces which are located in alignment behind at least one groove-rib connection of the cover disc on the housing, a front closure of the spaces and continuity of the shape of the connecting edge zone being achieved simultaneously by a packing of the bearing with an end profile of the groove and rib type and by a bent edge of at least one cover, for a partial section of the groove-rib connection which closes at least the accommodating space the shoe, the rear surface of the reflector carrying an actuating rod, which is located in said horizontal plane, and a second actuating rod which is arranged in another horizontal plane.

2. The improvement defined in claim 1 wherein the bearing is arranged between an edge of the housing and the cover disc.

3. The improvement defined in claim 1 wherein the shoe is arranged slidably in a groove which is molded in the housing and is closed at the cover disc by said cover.

4. The improvement defined in claim 1 wherein at least one of said rods is connected by a joint ball to a manual control element.

5. The improvement defined in claim 4 wherein the manual control element is a screw.

6. A headlamp for an automotive vehicle comprising:
a housing forming an enclosure open at one side;
a reflector received in said housing and open toward said side, said reflector being provided with a ball engageable in a ball socket formed in said housing, and a stub shaft opposite said ball extending along a horizontal axis through said ball;
a shoe rotatably receiving said stub shaft;
guide means in said housing receiving said shoe to enable linear displacement thereof in a direction perpendicular to said axis whereby said reflector is pivotal about a vertical axis through said ball; and
respective adjusters for independently pivoting said reflector about said horizontal axis and about said vertical axis.

* * * * *